(12) United States Patent
Liu

(10) Patent No.: US 7,643,710 B1
(45) Date of Patent: Jan. 5, 2010

(54) METHOD AND APPARATUS FOR EFFICIENT COUPLING BETWEEN SILICON PHOTONIC CHIP AND OPTICAL FIBER

(75) Inventor: Ansheng Liu, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/212,424

(22) Filed: Sep. 17, 2008

(51) Int. Cl.
*G02B 6/26* (2006.01)
(52) U.S. Cl. .............................. 385/43; 385/15; 385/39; 385/129; 385/132
(58) Field of Classification Search .................... 385/15, 385/39, 43, 129, 132
See application file for complete search history.

(56) References Cited

U.S. PATENT DOCUMENTS 7,088,890 B2    8/2006  Liu

2005/0105853 A1    5/2005  Liu et al.
2005/0185893 A1    8/2005  Liu

*Primary Examiner*—Jennifer Doan
(74) *Attorney, Agent, or Firm*—Blakely, Sokoloff, Taylor & Zafman LLP

(57) ABSTRACT

A method and apparatus for efficient coupling between a silicon photonic chip and an optical fiber is described. In one embodiment, an apparatus according to embodiments of the present invention includes: a first optical waveguide having a first end to optically couple to a first external device and a second end, the second end having a taper with a tip at the second end, a second optical waveguide optically coupled to the taper of the first optical waveguide, having a taper with a tip at a second end, and a third optical waveguide optically coupled to the taper of the second optical waveguide, the third optical waveguide to optically couple to a second external device having a larger cross-sectional area than the first external device.

21 Claims, 2 Drawing Sheets

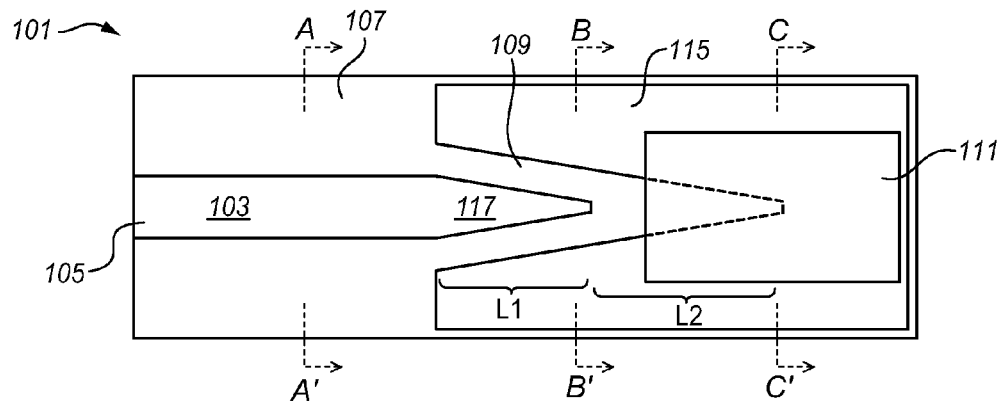
FIG. 1
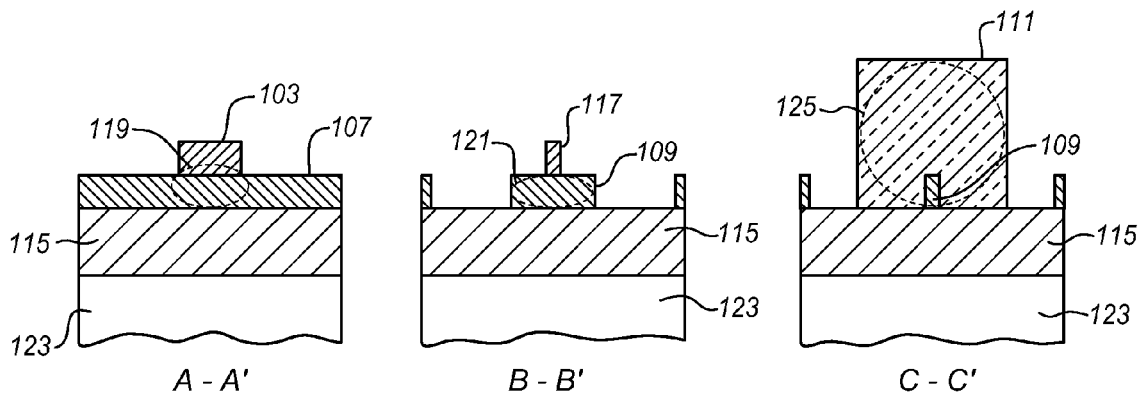
FIG. 2   FIG. 3   FIG. 4

METHOD AND APPARATUS FOR EFFICIENT COUPLING BETWEEN SILICON PHOTONIC CHIP AND OPTICAL FIBER

BACKGROUND

1. Field of the Invention

The present invention relates generally to optics and, more specifically, the present invention relates to optical waveguide tapers.

2. Background Information

Internet and network data traffic growth rate is pushing a desire for optical-based data communication. Transmission of multiple optical channels over the same fiber in dense wavelength-division multiplexing (DWDM) systems and Gigabit Ethernet (GBE) systems provide a simple way to use the higher data capacity (signal bandwidth) offered by fiber optics. Commonly used optical components in data communications systems include wavelength division multiplexed (WDM) transmitters and receivers, optical filters such as diffraction gratings, thin-film filters, fiber Bragg gratings, arrayed-waveguide gratings, optical add/drop multiplexers, modulators, lasers and optical switches.

Many of these building block optical components can be implemented in semiconductor devices. As such, the semiconductor devices are typically connected to optical fibers. Three-dimensional tapered waveguides or mode size converters are typically used to couple light between a semiconductor waveguide device and a fiber because semiconductor waveguide devices usually have smaller mode sizes compared to optical fiber mode sizes. The semiconductor waveguides allow the light to propagate through a photonic chip that contains various components such as a modulator, switch, multiplexer, and so on. The large differences in refractive index possible in semiconductor waveguide systems allow for the smaller waveguide dimensions.

Silicon photonic integrated chips (PIC) are used for high-speed optical interconnects, for modulation and for switching. As the size of a silicon waveguide in a PIC is usually much smaller than the core diameter of an optic fiber, a waveguide taper is used. The taper directs and expands the optical modal size of the silicon waveguide to match the optic fiber.

BRIEF DESCRIPTION OF THE DRAWINGS

The present invention is illustrated by way of example and not limitation in the accompanying figures.

FIG. 1 is a top elevation view diagram of one embodiment of a tapered waveguide coupler in accordance with the teachings of the present invention.

FIG. 2 is a cross sectional side view diagram of the coupler of FIG. 1 taken along line A-A' in accordance with the teachings of the present invention.

FIG. 3 is a cross sectional side view of the coupler of FIG. 1 taken along line B-B' in accordance with the teachings of the present invention.

FIG. 4 is a cross sectional side view of the coupler of FIG. 1 taken along line C-C' in accordance with the teachings of the present invention.

DETAILED DESCRIPTION

Figure 5:
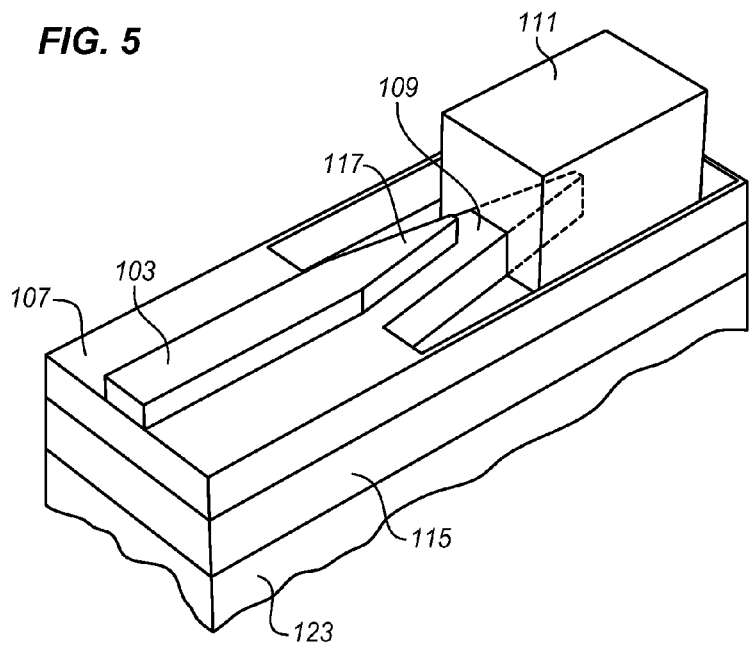
FIG. 5 is a perspective view of the coupler of FIG. 1 in accordance with the teachings of the present invention.

In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale. Furthermore, it is also appreciated that the specific dimensions, index values, materials, etc. illustrated herewith are provided for explanation purposes and that other suitable dimensions, index values, materials, etc., may also be utilized in accordance with the teachings of the present invention.

In one embodiment of the present invention, a novel tapered waveguide device including a first optical waveguide with a first taper and a second optical waveguide with a second taper into a third optical waveguide to couple to an optic fiber is disclosed. Embodiments of the disclosed tapered waveguide device have low optical coupling loss and may be utilized with miniaturized single mode semiconductor based waveguides enabling high-speed operation with semiconductor based photonic devices such as for example silicon based optical modulators, micro-ring resonators, photonic band gap devices and the like.

In one embodiment of the present invention, a tapered waveguide device includes a tapered silicon rib waveguide to shrink the mode size of an optical beam guided in a silicon waveguide, coupled to a second tapered waveguide defined by taper etching, coupled into a silicon oxynitride (SiON) waveguide monolithically integrated in a semiconductor layer. To illustrate, FIG. 1 shows one embodiment of a tapered waveguide device 101 disposed in semiconductor material in accordance with the teachings of the present invention. As shown in the depicted embodiment, tapered waveguide device 101 is disposed in a semiconductor layer and includes a first optical waveguide 103, a second optical waveguide 109, and a third optical waveguide 111.

FIG. 1 schematically shows a silicon taper on a silicon-on-insulator (SOI) substrate. Such a taper may be integrated onto a photonic integrated circuit (PIC) or be a separate component. The light transmitted from a silicon or other small waveguide is channeled into an opening 105 of first waveguide 103. This waveguide is defined by rib etching and to meet the particular device design and performance constraints of the particular application. While an SOI construction is shown, this is not necessary to the invention and other technologies may be used. In addition, light may enter the waveguide from any other device that is coupled adjacent to or set near to the opening 105.

In one embodiment of the present invention, opposite the opening, the first waveguide has a taper 117. The taper has a larger end at the opening where the light is received from other devices of a PIC. The taper has a smaller end that ends at a tip opposite the larger end. The taper is aligned with a second waveguide 107 directly below and parallel to the first. The second waveguide also has a taper 109. The second waveguide's taper also has a larger end closer to the opening and a smaller end at a tip opposite the opening. In the illustrated example, the tapers of both waveguides begin at about the same location or distance from the opening 105.

Both tapers also are formed by angling the sidewalls of each waveguide toward each other at the same angle. The top and bottom walls are not angled and so each waveguide retains its height as it narrows. However, the particular configuration of each taper may be adapted to suit any particular circumstance. The tapers of both waveguides converge to a point or tip, but the second waveguide starts wider and converges to a point farther away from the opening than the first waveguide.

The second waveguide extends into a third waveguide 111 which is sized to couple to an optic fiber. This third waveguide is substantially larger than the first and second waveguides and does not have any taper in the illustrated example.

In one embodiment of the present invention, in order to couple to a silicon waveguide in a photonic device, the first waveguide 103 has a rectangular cross section with a width of ~0.4 μm and a height of ~0.4 μm. This is shown in FIG. 2 which is a cross sectional view of the coupler of FIG. 1 taken along line A-A'. This waveguide is built upon a rib etching layer 107 with an etch depth of ~0.2 μm as shown in FIG. 1. As a result, the received optical mode 119 can propagate through portions of both waveguides with a mode size that approximately fills a 0.4 μm square as shown in FIG. 1. The waveguide dimensions may be modified to suit any particular light source. The dimensions of the current example are determined by the dimensions of a particular PIC.

FIG. 3 is a cross-sectional view of the coupler of FIG. 1 taken along line B-B'. To expand the modal size of the PIC waveguide for fiber coupling, the top waveguide 103 has a taper 117 to taper the waveguide width down to ~0.1 μm from 0.4 μm. This taper has a length indicated in FIG. 1 as L1. In addition the second waveguide 107 has started a taper 109 formed by strip/taper etching.

In operation, because of the narrow waveguide width at the tip of the top waveguide, the optical mode is pushed down from the first waveguide into the second waveguide. As a result, the modal height after the first taper section is almost half of the height before tapering. As indicated above, this height, in one embodiment of the present invention, is ~0.2 μm.

The tapered optical mode propagates to the second taper region 109, which is defined by silicon etching. The silicon, as shown in FIGS. 2, 3, and 4, is etched down to a buried oxide (BOX) layer 115. This strip/taper etching region starts at the beginning of the first waveguide's rib tapering 109, as shown in FIG. 1. This achieves adiabatic tapering from a single-mode rib waveguide to a strip waveguide without significant loss.

In one embodiment of the present invention, the tip of the second taper 109 (of the second waveguide 107) is 0.08 μm-0.1 μm and the taper length is shown in FIG. 1 as L2. Because the tip dimension is ~0.1 μm×0.2 μm, such a silicon waveguide is not typically able to support any guided mode inside the silicon region for the light wavelengths around 1.3 and 1.55 um.

The tapered silicon tip region of the second waveguide is covered with a ~5 μm×5 μm SiON layer 111 forming the third waveguide that has a slightly higher refractive index than that of the buried oxide. The optical mode is tapered from the silicon region 109 into the SiON region 111. As shown in FIG. 4, the optical mode then fills the third waveguide as it is pushed out of the second taper.

Comparing the size of the optical modes in FIGS. 2, 3, and 4, in FIG. 1, the optical mode 119 is almost circular and a little over 0.4 μm in diameter. In FIG. 2, the optical mode 121 has been flattened as it is pushed out of the first waveguide 103 and completely into the second waveguide 107. The now elliptical mode has a height of less than 0.2 μm and a width that almost fills the second waveguide of about 0.8 μm. In FIG. 4, the optical mode 125 fills the SiON waveguide. This third waveguide 111 has a square cross-section with sides of ~5 μm, so that the mode is now circular with a radius of just under 5 μm. The two stage tapering accomplishes a significant mode expansion with very low losses. The size of the third waveguide is selected to couple to a single mode optical fiber. The dimensions of the third waveguide may be adapted to suit optic fibers of other sizes or any other structure into which the optical mode is to be coupled.

As the refractive index of SiON is slightly larger than that for oxide, the light reflection coefficient at the taper/air facet can be relatively small (few percent). For some applications, an anti-reflection coating may be applied to the taper facet to reduce the taper reflection. For some other applications, an angled facet taper may be applied to minimize the reflection.

The described coupler combines the advantages of both tapers to couple PIC silicon waveguides of about 0.4 μm-1.0 μm to an optic fiber. Such a waveguide dimension is typical for photonic devices in order to meet performance constraints such as a high-speed silicon modulators and small-form factor MUX/DEMUX (multiplexer/demultiplexer) However, the particular dimensions provided herein may be adapted to suit other circumstances.

Referring again to FIGS. 2-4, the waveguides are formed over a silicon substrate 123. However, other substrate materials may be used to suit particular circumstances. A buried oxide layer 115 is formed over the silicon substrate to form an SOI (Silicon on Insulator) structure. The silicon and SiON waveguide structures are formed over the BOX layer.

FIG. 5 is a perspective view of the coupler of FIG. 1 as seen from the IC connection side. The optic mode from a silicon PIC couples to the first 103 waveguide (not shown) or by continuing the IC waveguide into the first and second waveguides on the same substrate 115, 123. As can be seen, the first waveguide tapers 117 at its far end pushing the light mode into the second waveguide. The second waveguide also has a taper 117 that starts at about the same position, but ends within the SiON third waveguide 111. The third waveguide 111 can be butt coupled to an optic fiber or through a microlens (not shown). Thus, a small PIC waveguide mode is very efficiently coupled into an optic fiber with very low losses.

In each of the figures, the coupler is shown as a discrete component and it may be formed this way or many couplers may be formed on a single die and cut apart into separate components. In other embodiments, the coupler may be one of many components on a single substrate. The coupler may also be a component of a photonic integrated circuit. The PIC may include several couplers together with other devices in a single substrate.

In one embodiment of the present invention, on the substrate 123, a BOX layer 115 is formed. The second waveguide is formed over the BOX layer. In the illustrated example, the second waveguide is formed as a silicon layer directly on top of the BOX layer. The second waveguide is formed as a solid layer covering the entire BOX layer and is then etched or stripped to form the taper as described above. The shape of the taper is shown in FIG. 1. As shown, the second waveguide has an initial width that is substantially greater than that of the first waveguide. In the cross section of FIG. 2, the first waveguide layer has a width that is the same as that of the coupler, although the optical mode uses only a small portion of this width. The width may be chosen to be narrower than illustrated, depending on the circumstances. The second waveguide is then etched on its sides to form the taper 109. The taper continues to a tip past which the silicon layer is completely removed.

The first waveguide and the SiON third waveguide are both formed over the second waveguide at opposite ends of the coupler. The first waveguide is formed by depositing a second layer of silicon and then etching away the edges to form the narrow shape of FIG. 1 which ends with a taper 117 and a tip. The SiON layer is then deposited at the opposite end and shaped to form the rectangular structure as illustrated.

As can be seen in FIG. 1, the dual taper coupling system adds only one additional fabrication step compared to producing waveguides for a PIC. This requires only one more mask and that is to produce the two waveguides to couple into the third waveguide instead of one.

The small tip width of the smaller end of both tapers results in a substantially small optical coupling loss in accordance with the teachings of the present invention. In one embodiment, with the tip width of the smaller end of both tapers is about 0.08 μm and the tip height is about 1 μm. In various embodiments, it is appreciated that either taper may be linearly, nonlinearly or piece-wisely linearly tapered in accordance with the teachings of the present invention. The dimensions of any of the structures described above may be modified to suit any particular circumstances.

For application to coupling a single mode PIC to a single mode optic fiber, the taper performance can be modeled. Given the dimensions described above, the modeled taper junction loss at the first and second taper ends is less than 0.1 dB with a tip size of about 0.1 μm. Such a tip width is easily obtained with conventional photolithography technologies, such as 193 nm technology. Even at a tip width of ~0.125 μm for the first taper and ~0.175 μm for the second taper, the taper junction loss is only about 0.2 dB.

The taper transition loss vs. the taper length can also be modeled. For the first stage taper, the taper loss is smaller than 0.1 dB with L1=100 μm. Losses remain low as the length of the first taper 117 (L1) increase and are still low with L1 as short as 80 μm. For the second taper, the taper loss is smaller than 0.1 dB with L2=150 μm or more. Losses are still low with a taper as short as 130 μm. Thus, with a total taper length (L1+L2) of about 250 μm, there is a total taper loss of less than 0.5 dB. This loss number does not include the waveguide scattering loss due to the surface/sidewall roughness, but this is expected to be small because total taper length is small. Workable systems at standard wavelengths using standard materials may be as short as 180 μm and may be much longer, depending on the circumstances.

While embodiments of the invention have been described in the context of single mode fiber and single modes propagating through waveguides, the invention is not so limited. While embodiments of the invention have been described in the context of light entering the first waveguide and propagating through the third waveguide, due to the principles of reciprocity, embodiments of the invention may just as well be applied to light entering the third waveguide, e.g. from a fiber, and the propagating to the second and then the first waveguide for coupling to an external device.

Figure 6:
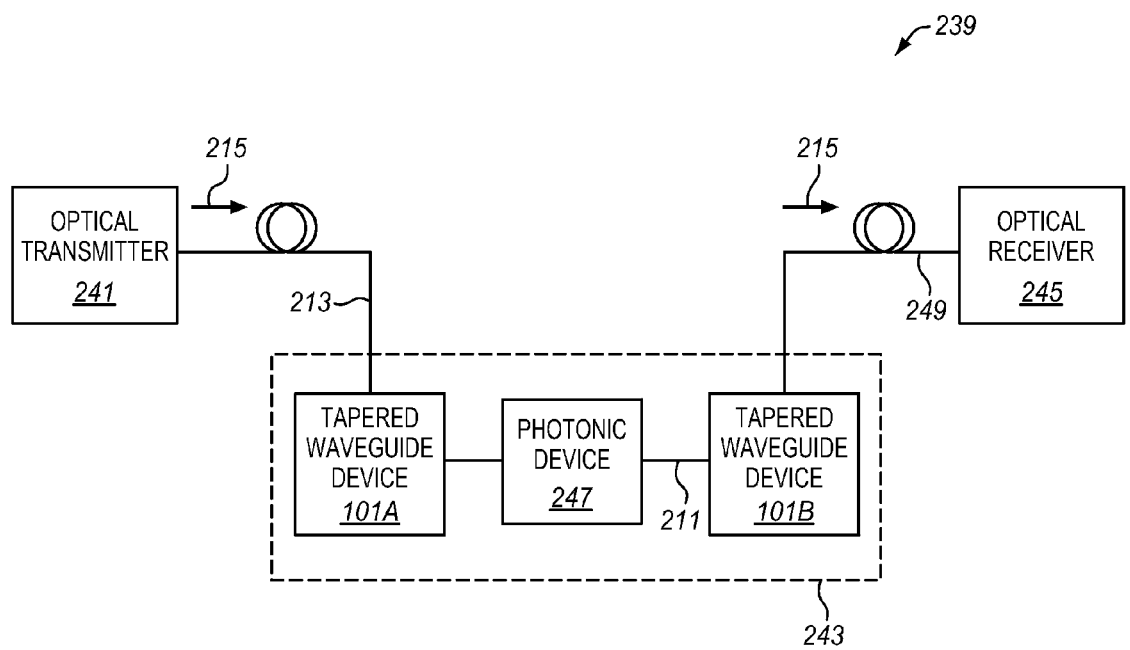
FIG. 6 is a block diagram of a system incorporating the coupler of FIG. 1 together with a photonic device for optical data communications according to embodiments of the present invention.

FIG. 6 is a block diagram illustration of one embodiment of a system 239 including, in one embodiment, a semiconductor device including a tapered waveguide device and a photonic device according to embodiments of the present invention. As illustrated in the depicted embodiment, system 239 includes an optical transmitter 241, in which lasers, modulators, and multiplexers are included. The transmitter outputs an optical beam 215 through fiber 213. The transmitter may use a coupler such as that shown in FIG. 1. System 239 also includes an optical receiver 245 and an optical device 243 that is optically coupled between the optical transmitter 241 and optical receiver 245 through an optic fiber. In one embodiment, the optical device 243 includes semiconductor material, such as, for example, an epitaxial silicon layer in a chip, with a tapered waveguide receiver device 101A, a tapered waveguide transmitter device 101B and a photonic device 247 included therein.

In one embodiment, tapered waveguide devices 101A and 101B are substantially similar to tapered waveguide device 101 described in FIGS. 1-5 above. In one embodiment, tapered waveguide devices 101A, 101B, and photonic device 247 are semiconductor-based devices that are provided in a fully and monolithically integrated solution on a single integrated circuit chip. In one embodiment, the optical receiver 245 includes a photonic device that contains photo-detectors, demultiplexers, and tapered waveguide devices also as described in FIGS. 1-5.

In operation, optical transmitter 241 transmits optical beam 215 to optical device 243 through an optical fiber 213. Optical beam 215 is then optically coupled to a first tapered waveguide device 101A such that optical beam 215 is received at photonic device 247. The photonic device may include any known semiconductor-based photonic optical device including for example, but not limited to, a laser, an optical phase shifter, modulator, multiplexer, switch or the like. The photonic device performs a function or operation depending upon the particular nature of the device. The photonic device 247 is coupled to a second tapered waveguide device 101B to couple the optical beam to the optical fiber 249.

After an optical beam is output from the transmitter 243, it is then optically coupled to optic receiver 245. In one embodiment, optical beam 215 is propagated through an optical fiber 249 to propagate from optical device 243 to optical receiver 245.

In the described embodiment the optical device and tapered waveguides can channel optical signals with data rates sufficient for GbE (Gigabit Ethernet), USB 3 (Universal Serial Bus Version 3), DisplayPort and other high speed data interfaces.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A coupler for optical communication comprising:
   a first optical waveguide of a first semiconductor material and a first semiconductor layer, the first optical waveguide having a first end to optically couple to a first external device and a second end, the second end having a taper with a tip at the second end;
   a second optical waveguide of a second semiconductor material and a second semiconductor layer, the second optical waveguide being optically coupled to the taper of the first optical waveguide, the second optical waveguide having a first end and a second end, the second end having a taper with a tip at the second end; and a third optical waveguide of a third semiconductor material, the third optical waveguide being optically coupled to the taper of the second optical waveguide, the third optical waveguide having a larger cross-sectional area than the first and the second optical waveguides to optically couple to a second external device having a larger cross-sectional area than the first external device.

2. The coupler of claim 1, wherein the first optical waveguide is parallel to and adjacent to the second optical waveguide.

3. The coupler of claim 1, wherein the first end of the first optical waveguide is to receive an optical beam from the first external device, wherein the optical beam is directed by the taper from the first optical waveguide to the second optical waveguide the first end of the second optical waveguide being to receive the optical beam, and wherein the third optical waveguide is to project the optical beam to an external waveguide.

4. The coupler of claim 3, wherein the first end of the first and the second optical waveguides are adjacent and coupled to both receive a portion of the optical beam.

5. The coupler of claim 1, wherein the taper of the first optical waveguide and the taper of the second optical waveguide each have a larger end and a tip, and wherein the larger end of each taper is positioned at the same distance from the first end of the first optical waveguide.

6. The coupler of claim 5, wherein the larger end of the taper of the first optical waveguide is smaller than the larger end of the second optical waveguide and wherein the tip of the taper of the second optical waveguide is farther from the first end of the first optical waveguide than the tip of the taper of the first optical waveguide.

7. The coupler of claim 6, wherein the tapers of the first optical waveguide and of the second optical waveguide are formed by an equal angle in the walls of the respective waveguides so that the respective waveguides taper at the same rate.

8. The coupler of claim 1, wherein the third optical waveguide has a rectangular cross section.

9. The coupler of claim 1, wherein the tip of the second waveguide extends into the third waveguide.

10. The coupler of claim 1, wherein the third optical waveguide is formed from silicon oxynitride.

11. The coupler of claim 1, wherein the external waveguide is an optic fiber.

12. The coupler of claim 1, wherein the first external device comprises a semiconductor waveguide.

13. The coupler of claim 1, wherein the second optical waveguide has an index of refraction that is higher than the index of refraction of the first optical waveguide.

14. The coupler of claim 13, wherein the third optical waveguide has an index of refraction that is higher than the index of refraction of the second optical waveguide.

15. The coupler of claim 1, wherein the first optical waveguide is a rib waveguide disposed in the semiconductor layer.

16. A method comprising:
   directing an optical beam into a first optical waveguide of an optical coupler comprised of a first semiconductor material and a first semiconductor layer;
   directing the beam through a taper at an end of the first optical waveguide from a larger end of the taper to a smaller end of the taper into a second optical waveguide comprised of a second semiconductor material and a second semiconductor layer;
   directing the optical beam through a taper at an end of the second optical waveguide from a larger end of the taper to a smaller end of the taper into a third optical waveguide of a third semiconductor material, the third optical waveguide having a larger cross sectional beam area than the first and the second optical waveguides; and
   directing the beam from the third optical waveguide to an external waveguide.

17. The method of claim 16, wherein directing the optical beam into the second optical waveguide comprises reducing a mode size of the optical beam in one direction while increasing the mode size of the optical beam in a second direction.

18. The method of claim 16, wherein directing the optical beam into the third optical waveguide comprises increasing a mode size of the optical beam.

19. A system for optical communications comprising:
   an optical transmitter to transmit an optical beam;
   an optical receiver to receive an optical beam;
   an optical device disposed between the optical transmitter and the optical receiver, the optical device including:
      a photonic device to receive the optical beam and perform operations thereon, and
      a coupler to receive the optical beam from the photonic device and direct it into an optic fiber for transmission to the receiver, the coupler having a first optical waveguide of a first semiconductor material and a first semiconductor layer, the first optical waveguide having a first end to receive an optical beam and a second end, the second end having a taper with a tip at the second end, a second optical waveguide of a second semiconductor material and a second semiconductor layer, the second optical waveguide being coupled to the taper of the first optical waveguide so that the optical beam is directed by the taper from the first optical waveguide to the second optical waveguide, the second optical waveguide having a first end and a second end, the second end having a taper with a tip at the second end, and a third optical waveguide of a third semiconductor material, the third optical waveguide being coupled to the taper of the second optical waveguide so that the optical beam is directed by the taper of the second optical waveguide to the third optical waveguide, the third optical waveguide having a larger cross-sectional area than the first and the second optical waveguides to project the optical beam to the optic fiber.

20. The system of claim 19, wherein the coupler further comprises an antireflective region disposed in a semiconductor layer between the smaller end of the first optical waveguide and the larger end of the second optical waveguide.

21. The apparatus of claim 19, wherein the first and second semiconductor materials include silicon (Si) and the third semiconductor material includes silicon oxynitride (SiON).

* * * * *

UNITED STATES PATENT AND TRADEMARK OFFICE
CERTIFICATE OF CORRECTION

| | | |
|---|---|---|
| PATENT NO. | : 7,643,710 B1 | |
| APPLICATION NO. | : 12/212424 | |
| DATED | : January 5, 2010 | |
| INVENTOR(S) | : Liu | |

It is certified that error appears in the above-identified patent and that said Letters Patent is hereby corrected as shown below:

In the Specification

Please insert in column 1, line 5 before BACKGROUND:

--STATEMENT OF GOVERNMENT INTEREST

This invention was made with Government support under contract number H98230-08-3-0011 awarded by the Department of Defense. The Government has certain rights in this invention.--

Signed and Sealed this
First Day of December, 2015

Michelle K. Lee
*Director of the United States Patent and Trademark Office*